United States Patent
June

(10) Patent No.: US 8,622,085 B2
(45) Date of Patent: Jan. 7, 2014

(54) SELF-SEALING HYDRAULIC CONTROL LINE COUPLING

(71) Applicant: Cameron International Corporation, Houston, TX (US)

(72) Inventor: David R. June, Houston, TX (US)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 13/692,967

(22) Filed: Dec. 3, 2012

(65) Prior Publication Data

US 2013/0092248 A1    Apr. 18, 2013

Related U.S. Application Data

(63) Continuation of application No. 12/741,365, filed as application No. PCT/US2008/081027 on Oct. 23, 2008, now Pat. No. 8,393,354.

(60) Provisional application No. 60/990,245, filed on Nov. 26, 2007.

(51) Int. Cl.
*F16L 37/32* (2006.01)

(52) U.S. Cl.
USPC ............. 137/614.04; 137/614.02; 137/614.05

(58) Field of Classification Search
USPC ................ 137/515, 613, 614, 614.02–614.05
See application file for complete search history.

(56) References Cited

U.S. PATENT DOCUMENTS

| 3,213,884 A | 10/1965 | Moyer et al. |
| 4,637,470 A | 1/1987 | Weathers et al. |
| 4,754,813 A | 7/1988 | Jennings et al. |
| 4,971,107 A | 11/1990 | Yonezawa |
| 5,385,169 A | 1/1995 | Odelius |
| 6,082,460 A | 7/2000 | June |
| 6,227,245 B1 | 5/2001 | Smith, III |
| 6,564,829 B2 | 5/2003 | Arisato |
| 7,159,616 B2 | 1/2007 | Watson et al. |
| 2006/0102238 A1 | 5/2006 | Watson |
| 2011/0108279 A1 | 5/2011 | June |

FOREIGN PATENT DOCUMENTS

| GB | 2132728 | 7/1984 |
| GB | 2184508 | 6/1987 |

OTHER PUBLICATIONS

PCT International Search Report and Written Opinion for PCTUS2008/081027, dated Feb. 25, 2009.

*Primary Examiner* — John K Fristoe, Jr.
*Assistant Examiner* — Angelisa Hicks
(74) *Attorney, Agent, or Firm* — Fletcher Yoder, P.C.

(57) ABSTRACT

There is provided a hydraulic fluid control line connector including first and second couplings configured to automatically seal shut when the members are disengaged. There is further provided a method for blocking contamination or pressure transfer of hydraulic fluid control lines by securing first and second couplings to corresponding ends of a hydraulic line and automatically sealing the couplings shut when the couplings are disengaged.

30 Claims, 13 Drawing Sheets

SELF-SEALING HYDRAULIC CONTROL LINE COUPLING

CROSS REFERENCE TO RELATED APPLICATIONS

This application claims priority to and benefit of U.S. application Ser. No. 12/741,365, entitled "Self-Sealing Hydraulic Control Line Coupling," filed on May 4, 2010, which is herein incorporated by reference in its entirety, and which claims priority to and benefit of PCT Patent Application No. PCT/US2008/081027, entitled "Self-Sealing Hydraulic Control Line Coupling," filed on Oct. 23, 2008, which is herein incorporated by reference in its entirety, and which claims priority to and benefit of U.S. Provisional Patent Application No. 60/990,245, entitled "Self-Sealing Hydraulic Control Line Coupling", filed on Nov. 26, 2007, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to myriad other uses. Once a desired resource is discovered below the surface of the earth, drilling and production systems are often employed to access and extract the resource. These systems may be located onshore or offshore depending on the location of a desired resource.

Further, such systems generally include a wellhead assembly through which the resource is extracted. These wellhead assemblies may include a wide variety of components and/or conduits, such as various control lines, casings, valves, and the like, that control drilling and/or extraction operations. As will be appreciated, various control lines or other components of a production or transport system are typically coupled to one another to provide a path for hydraulic control fluid, chemical injections, or the like to be passed through the wellhead assembly. Such control lines are often disposed in various passages through components of the wellhead assembly, such as a tubing spool, a tubing hanger, a christmas tree, and/or a running tool.

The control lines may be surrounded in the passage by heavy drilling fluid, which is used to facilitate the drilling and removal of cuttings from a drill bore. When the control lines are disengaged, for example, to remove the running tool, the christmas tree, or the tubing hanger, it is desirable to keep the control lines relatively clear of contaminants, such as the heavy drilling fluid, so that downhole controls are not compromised due to clogs or damaged valves. Additionally, any fluid surrounding the coupling may be pressurized as a result of hydrostatic head pressure or pressure applied during well control or testing operations, and it is desirable to block that pressure from entering the fluid control system or downhole control lines if the control lines are engaged or disengaged.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, it is desirable to block heavy drilling fluid or pressurized fluid from entering hydraulic fluid control lines, particularly when the lines are disengaged. These hydraulic fluid lines may be used to control various valves in the wellhead, such as, for example, a surface controlled subsurface safety valve (SCSSV). In the event of temperature increase or line failure, where a pressure build-up of hydraulic fluid in the control line may open the safety valve, it is desirable for the hydraulic fluid controlling the safety valve to be relieved in order for the valve to close. Accordingly, an embodiment of the present invention provides a coupling which automatically blocks heavy drilling fluid or pressurized fluid from entering the hydraulic fluid control line when the coupling is disengaged while enabling the hydraulic fluid to escape in the event of a pressure build-up. It should be appreciated that, while this application describes embodiments in the context of a safety control valve, the disclosed coupling could be used in other hydraulic fluid lines. For example, hydraulic fluid lines may exist in a subsea control system, an umbilical, a manifold, an annulus closure, or any other well component.

Figure 1:
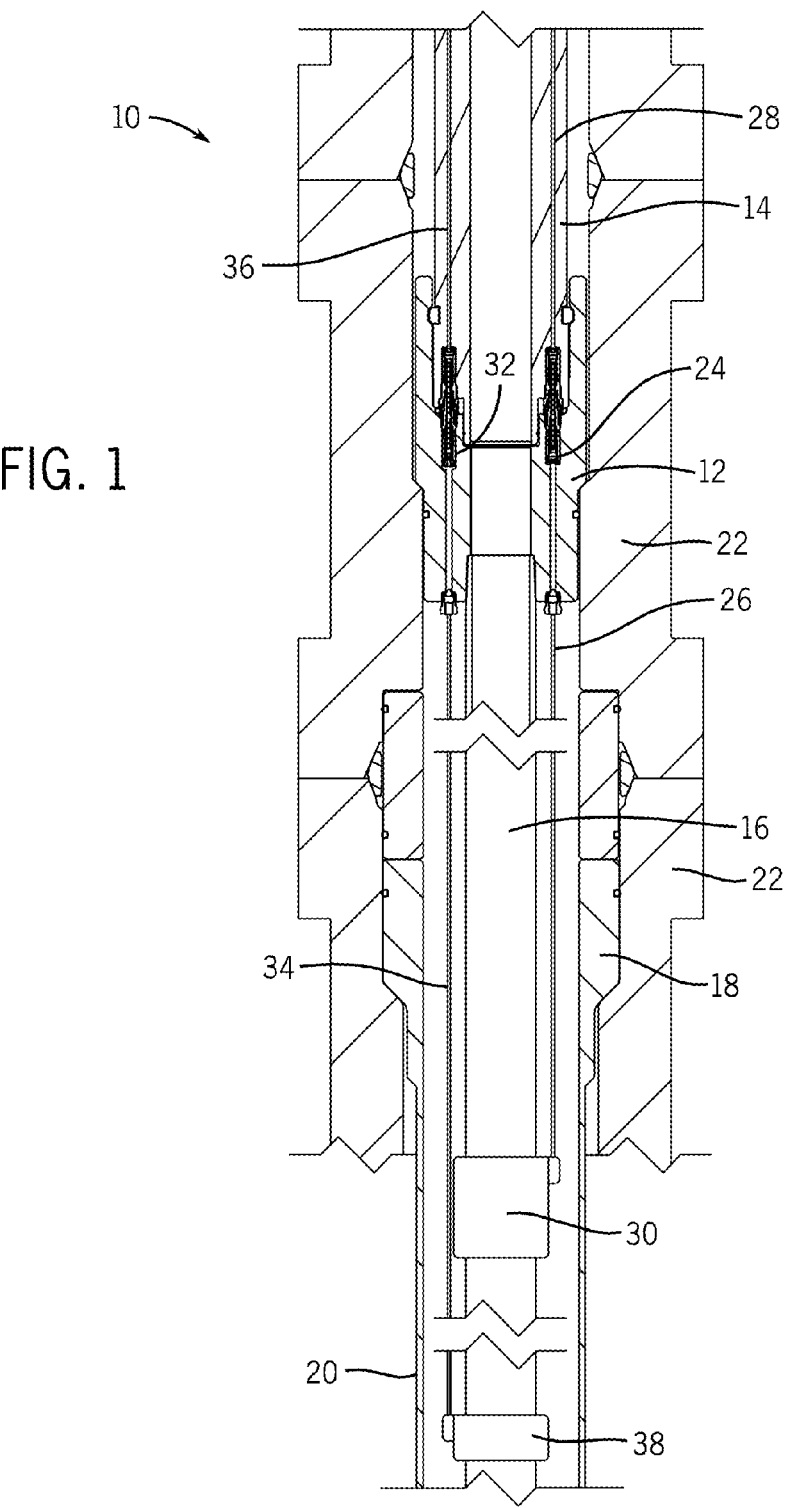
FIG. 1 is a partial cross-section of an embodiment of a mineral extraction system.

FIG. 1 illustrates components of an exemplary mineral extraction system 10. The mineral extraction system 10 may generally include a tubing hanger 12, a tubing hanger running tool 14, production tubing 16, a casing hanger 18, and a casing string 20. Upon completion of the system 10, the tubing hanger running tool 14 may be removed and a tree may be coupled to the tubing hanger 12. The tubing hanger 12 and the casing hanger 18 may be coupled to one or more wellhead members 22. In accordance with an embodiment of the present invention, one or more self-sealing hydraulic control line couplings 24 may be utilized to couple a downhole control line 26 associated with the production tubing 16 with a hydraulic supply line 28 in the tubing hanger running tool 12 or the tree. Hydraulic fluid may then be supplied to a SCSSV 30. In addition, one or more chemical injection couplers 32 may be utilized to couple a chemical delivery line 34 in the production tubing 16 with a chemical supply line 36 in the tubing hanger running tool 12 or the tree. Chemicals for injection into a mineral well may then be supplied to a downhole chemical injection valve 38.

Figure 2:
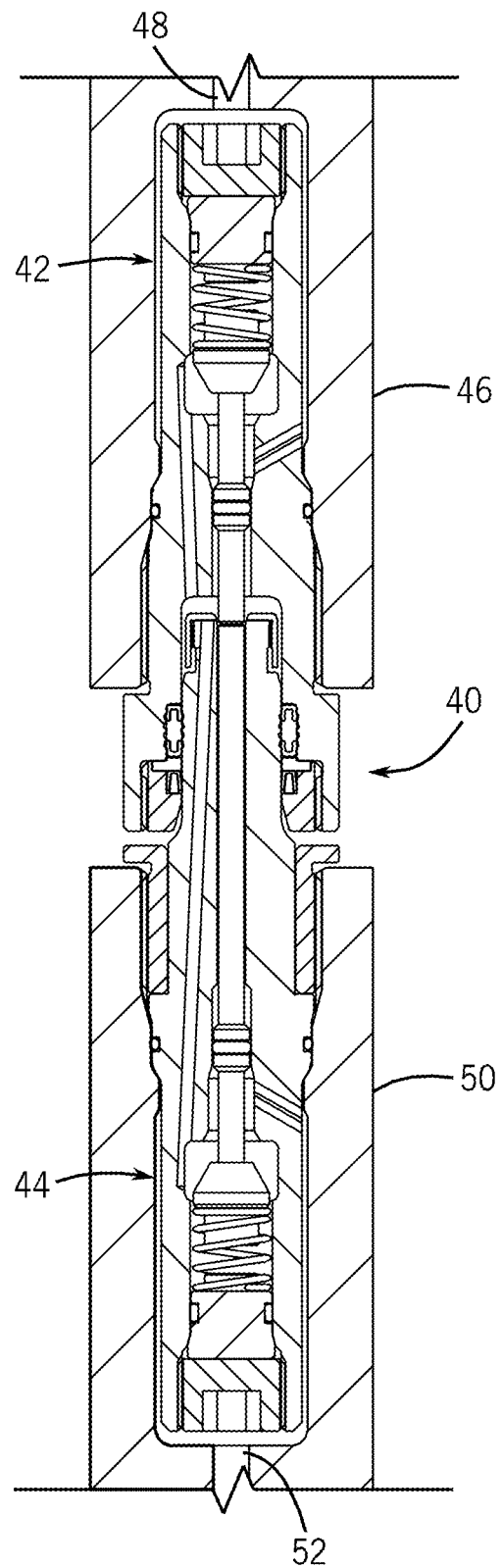
FIG. 2 is a partial cross-section of an embodiment of a hydraulic line coupling that may be used in the mineral extraction system of FIG. 1.

FIG. 2 depicts an exemplary embodiment of a stab-style hydraulic control line coupler 40 that includes a female stab 42 and a male stab 44. The female stab 42 may be coupled to a running tool 46 which includes a hydraulic fluid line 48. The hydraulic fluid line 48 carries hydraulic fluid from an external source to the coupler 40. The female stab 42 may also be connected to what is colloquially referred to as a "christmas tree" (hereinafter, a "tree"), or any other well component having a hydraulic fluid line running therethrough. The male stab 44 may be coupled to a tubing hanger 50. Simply put, the male and female stabs may be respectively arranged on any two wellhead components that are coupled to provide a continuous fluid passageway, for instance. A hydraulic fluid line 52 disposed within the tubing hanger 50 may be used to transport hydraulic fluid from the coupler 40 to hydraulic valves or other hydraulically controlled components in a wellhead member. In certain embodiments, the coupler 40 may be used in or coupled to a portion of a mineral extraction system, which may include a tree, a wellhead, a well, a mineral deposit (e.g., oil and/or gas), a valve, a casehead, a tubing hanger, tubing, a running tool, a manifold, an umbilical, or a combination thereof.

Figure 3:
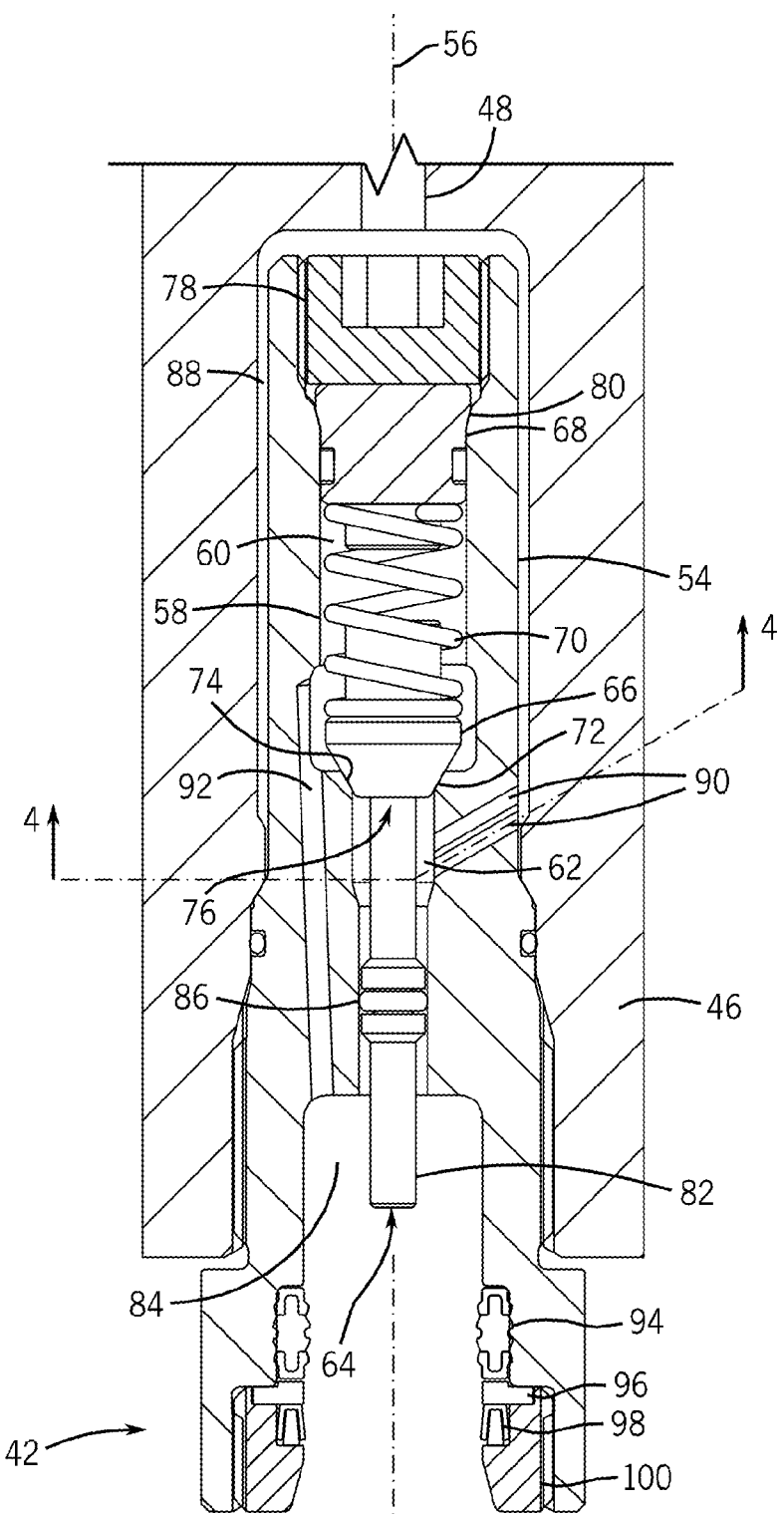
FIG. 3 is a partial cross-section of a first component of the hydraulic line coupling illustrated in FIG. 2.
Figure 4:
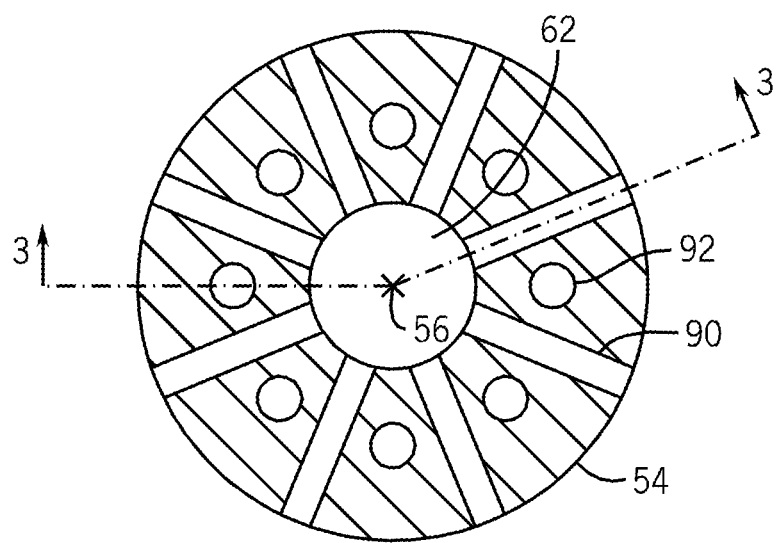
FIG. 4 is a cross-section of the first component of the hydraulic line coupling taken along line 4-4 of FIG. 3.

FIG. 3 illustrates an embodiment of the female stab 42 disconnected from the male stab 44. The female stab 42 is made of a generally cylindrical body 54. The body 54 may be metal, such as corrosion-resistant stainless steel. Components of the female stab 42 in FIG. 3 are illustrated along cross-sectional line 3-3 of FIG. 4, which is rotated about an axis 56 of the generally cylindrical body 54. FIG. 4 is a cross section of the generally cylindrical body 54 taken along an angled line 4-4 of FIG. 3.

The generally cylindrical body 54 may be screwed into or otherwise disposed within the running tool 46. A continuous bore 92 having varying diameters runs through the length of the body 54. The bore 92 may be divided into two general regions having dissimilar diameters, namely, a valve cavity 60 and a shaft cavity 62. Within each region, the diameter of the cavities 60 and 62 are generally similar. Situated within the valve cavity 60 is a valve 64 configured to automatically close upon separation of the female stab 42 from the male stab 44. In the illustrated embodiment, the valve 64 includes a poppet 66 and a sealing plug 68 with a spring 70 disposed therebetween. The poppet 66 has a diameter greater than that of the shaft cavity 62 and is therefore blocked from advancing all the way into the shaft cavity 62. An angled surface 72 of the poppet 66 corresponds to an angled surface 74 of an opening 76 between the valve cavity 60 and the shaft cavity 62. The angled surfaces 72 and 74 may press together to form a metal seal. At the other end of the valve cavity 60, the sealing plug 68 may be secured within the bore 92 by a fastener 78, such as, for example, a hex socket set screw. Furthermore, in the illustrated embodiment, a shoulder 80 on the sealing plug 68 blocks the sealing plug 68 from moving within the valve cavity 60.

The poppet 66 is also coupled to a shaft 82 which extends through the shaft cavity 62 into a reception area 84 for receiving the male stab 44. The shaft 82 may be depressed to compress the spring 70 and displace the poppet 66, as described in more detail below. A seal 86, such as an o-ring, may be disposed around a portion of the shaft 82 or housed in the shaft cavity 62. The seal 86 and shaft 82 remain in the shaft cavity 62 as the shaft 82 is depressed and released. The seal 86 may block fluid disposed in the shaft cavity 62 between the poppet 66 and the seal 86 from seeping into the reception area 84 and vice versa.

In use, the female stab 42 may be exposed to applied pressure or pressure from heavy well fluids. The described structures are configured such that the heavy well fluid is automatically blocked from entering and contaminating the hydraulic fluid passages when the female stab 42 is disengaged from the male stab 44. Hydraulic fluid may enter the female stab 42 through the line 48. A coupling cavity 88 is defined between the body 54 and the running tool 46. Hydraulic fluid may enter the coupling cavity 88 and flow through holes 90 to the shaft cavity 62. When the stabs 12 and 14 are disengaged, heavy well fluid may enter the female stab 42 through the reception area 84 and flow through a bore 92 to the valve cavity 60. Multiple holes 90 and bores 92 may be disposed around the axis 56 of the generally cylindrical body 54, as illustrated in FIG. 4. As can be seen in FIG. 4, the partial cross section illustrated in FIG. 3 is taken along rotated line 3-3 to better illustrate both the holes 90 and the bores 92. Furthermore, the cross section of FIG. 4 is taken along angle line 4-4 to better illustrate the bores 92.

When the shaft 82 is not depressed, such as when the female stab 42 is disengaged from the male stab 44, the spring 70 automatically biases the poppet 66 into the opening 76. The heavy well fluids in the valve cavity 60 further apply pressure to the poppet 66, thereby creating a metal seal between the angled surface 72 of the poppet 66 and the angled surface 74 of the opening 76. Counter pressure may also be applied to the poppet 66 from the hydraulic fluid in the shaft cavity 62; however this pressure is generally less than the pressure on the poppet 66 from the heavy drilling fluid and the spring 70. The pressure from the hydraulic fluid may build up enough to overcome the pressure from the heavy drilling fluid and the spring 70, for example, if the hydraulic fluid source is turned on to flush the heavy drilling fluid from the female stab 42 before it is coupled to the male stab 44. If the pressure of the hydraulic fluid in the shaft cavity 62 becomes great enough, the poppet 66 may be displaced from the opening 76 to alleviate the pressure in the hydraulic fluid. If the pressure in the hydraulic fluid decreases, the poppet 66 is again automatically biased into the opening 76 by the spring 70 and the pressure of the fluid in the valve cavity 60 to create the metal seal.

Furthermore, the female stab 42 includes a seal 94 configured to block leakage of the hydraulic fluid during use. The seal 94 may, for instance, be an elastomeric seal with metal caps (e.g., a metal endcap seal). A shoulder 96 holds the seal 94 in place in the body 54. A one-directional seal 98 is disposed below the seal 94 to allow escape of the heavy drilling fluid from the coupler 40 during coupling engagement, as described in more detail below. A nut 100 secures the one-directional seal 98 to the body 54 and holds the shoulder 96 in place.

Figure 5:
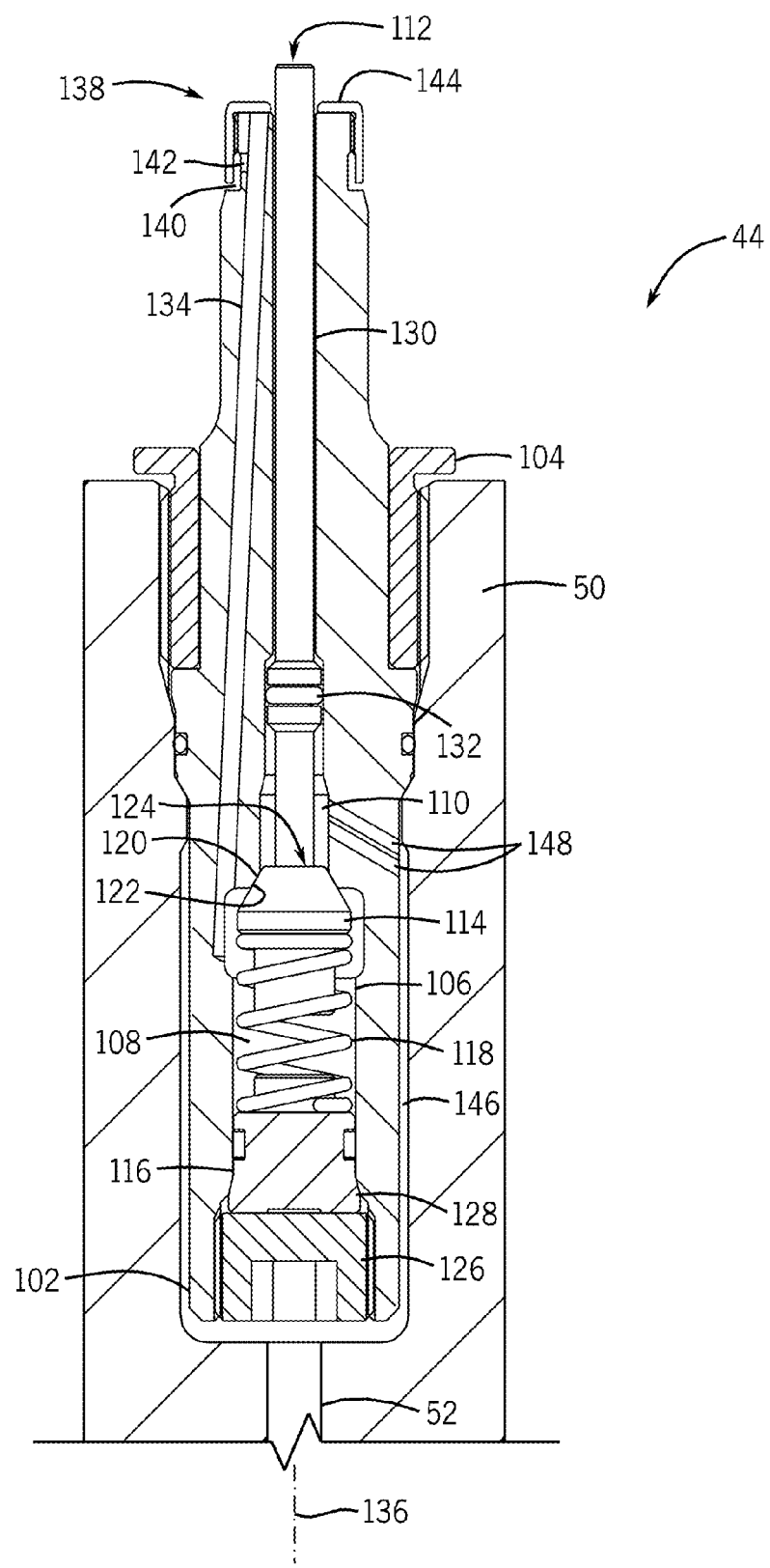
FIG. 5 is a partial cross-section of a second component of the hydraulic line coupling illustrated in FIG. 2.

FIG. 5 illustrates an embodiment of the male stab 44, which includes many of the same features described in the female stab 42. The male stab 44 includes a generally cylindrical body 102 made of metal, such as corrosion resistant stainless steel. The body 102 may be secured to the tubing hanger 50 via a nut 104. A continuous bore 106 having varying diameters runs through the length of the body 102. The bore 106 may be divided into a valve cavity 108 and a shaft cavity 110 having dissimilar diameters. Within each region, the diameter of the cavities 108 and 110 are generally similar. Disposed within the valve cavity 108 is a valve 112 including a poppet 114 and a sealing plug 116 having a spring 118 disposed therebetween. The poppet 114 has a diameter greater than that of the shaft cavity 110 and is therefore blocked from advancing all the way into the shaft cavity 110. An angled surface 120 of the poppet 114 corresponds to an angled surface 122 of an opening 124 between the valve cavity 108 and the shaft cavity 110. The angled surfaces 120 and 122 may press together to form a metal seal. At the other end of the valve cavity 108, a fastener 126, such as a hex socket set screw, secures the sealing plug 116 within the bore 106, while a shoulder 128 may block the sealing plug 116 from moving within the valve cavity 108.

The poppet 114 is coupled to a shaft 130 which extends through the shaft cavity 110 and out the body 102. The shaft 130 may be depressed to compress the spring 118 and displace the poppet 114, as described in more detail below. A seal 132, such as an o-ring, may be disposed around a portion of the shaft 130. The seal 132 and the shaft 130 remain in the shaft cavity 110 as the shaft 130 is depressed and released.

As with the female stab 42, the male stab 44 may be exposed to applied pressure or pressure from heavy well fluids. Furthermore, the tubing hanger 50 to which the male stab 44 is coupled may supply hydraulic fluid to various valves, such as the SCSSV. In order to protect the safety valve from being damaged due to a pressure build-up in the hydraulic control line, the male stab 44 is configured such that the pressure in the hydraulic tubing 22 may be released automatically, as with the female stab 42. Generally, during use, hydraulic fluid flows through the coupler 40 (FIG. 2) before the male stab 44 is disengaged from the female stab 42. Accordingly, cavities and passages in the male stab 44 may contain hydraulic fluid before the male stab 44 is exposed to heavy well fluids. For example, hydraulic fluid may be present in a bore 134 and the valve cavity 108. As with the female stab 42, the male stab 44 may include multiple bores 134 disposed around an axis 136.

When the male stab 44 is disengaged from the female stab 42, the described components operate to automatically seal the hydraulic fluid line 52 from contamination by heavy drilling fluids. That is, the spring 118 automatically biases the poppet 114 into the opening 124 when the shaft 130 is not depressed. Furthermore, pressure applied to the poppet 114 from fluids in the valve cavity 108 supplement the spring 118 to create the metal seal between the angled surface 120 of the poppet 114 and the angled surface 122 of the opening 124. Pressure is conveyed from the heavy drilling fluid outside the male stab 44 to the poppet 114 by compression of the hydraulic fluid within the male stab 44. Heavy drilling fluid is generally impeded from entering the male stab 44 by a fluid trap 138. Within an indent 140, a hole 142 provides access to the bore 134. A cover 144 substantially covers the indent 140, leading heavy drilling fluid to enter the indent 140 below the hole 142, thereby creating the fluid trap 138. That is, the heavy drilling fluid remains at the bottom of the indent 140, while the hydraulic fluid remains in the hole 142 and the bore 134. In addition to impeding entrance of heavy drilling fluid into the male stab 44, the fluid trap 138 reduces displacement of the hydraulic fluid by the heavy drilling fluid; therefore, any heavy drilling fluid that enters the male stab 44 merely compresses the hydraulic fluid in the bore 134 and the valve cavity 108. Pressure on the poppet 114 from the compressed hydraulic fluid automatically presses the poppet 114 into the opening 124, thus supplementing the spring 118 to form the metal seal.

As with the female stab 42 described above, in addition to automatically sealing the hydraulic fluid lines from contamination, the male stab 44 enables the release of pressure in the hydraulic fluid line to protect the valves, such as the surface controlled subsurface safety valve. Pressure in the hydraulic fluid from the SCSSV may be conveyed through a coupling cavity 146 and one or more holes 148 to the shaft cavity 110. Multiple holes 148 may also be disposed around the axis 136. Generally, the pressure on the poppet 114 from the fluid in the valve cavity 108 is greater than the pressure from the hydraulic fluid in the shaft cavity 110, and the metal seal remains closed. However, if the pressure from the SCSSV becomes too great, hydraulic fluid in the shaft cavity 110 may displace the poppet 114 to relieve the pressure. Once the pressure has been relieved, the poppet 114 is again automatically pressed into the opening 124 by the spring 118 and the pressure from the fluid in the valve cavity 108.

The design of the female stab 42 and the male stab 44 enables automatic operation of the valves 64 and 112, such as the poppets 66 and 114 in the illustrated embodiment. Merely disengaging the female stab 42 from the male stab 44 closes the valves 64 and 112. That is, no further controls must be implemented to close the fluid pathways in the coupling members. Furthermore, the forces on the valves 64 and 112 from the surrounding fluids (e.g., heavy drilling fluids) ensure that they remain closed, even under very high pressure. Indeed, the valves 64 and 112 close tighter as more pressure is applied from surrounding fluids, as described above.

Figure 6:
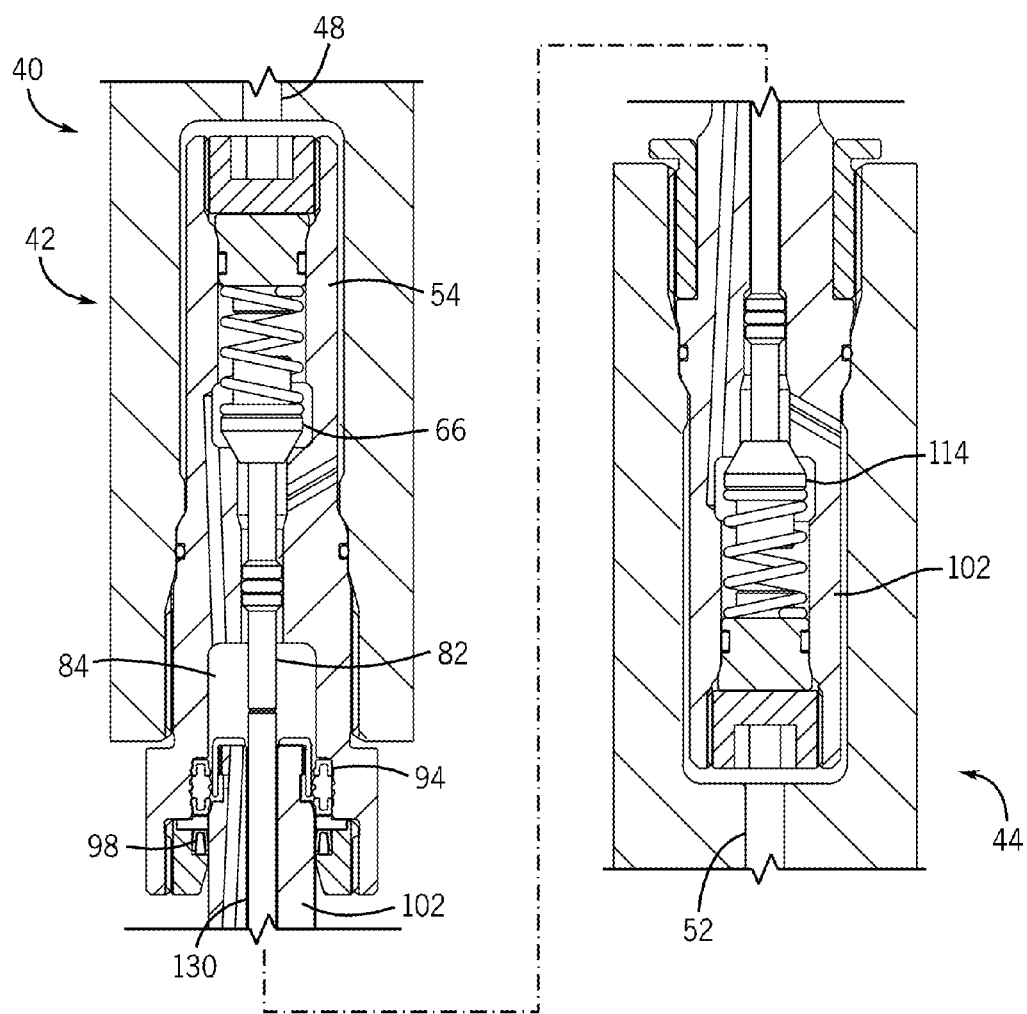
FIG. 6 is a partial cross-section of the partially engaged components of the hydraulic line coupling illustrated in FIG. 2.

Turning to FIG. 6, the female stab 42 and male stab 44 are illustrated in a partially coupled state. In this partially coupled state, the female shaft 80 is in contact with the male shaft 130, however neither shaft is displaced, as evidenced by the metal seals between the bodies 54 and 102 and the poppets 66 and 114, respectively. Prior to coupling engagement, the reception area 82 is initially filled with heavy drilling fluid. As the female stab 42 and the male stab 44 are pushed together, heavy drilling fluid may be displaced from the reception area 82 by flowing out through the space between the seal 92 and the male body 102 past the one-directional seal 98. The reception area 82 may be flushed or purged by applying fluid through the hydraulic fluid line 48, thereby increasing the pressure enough to displace the poppet 64 and enable flow of hydraulic fluid through the female stab 42, as described above in regard to FIG. 3. Differential pressure or heavy drilling fluid is blocked from entering the reception area 82 during coupling by the one-directional seal 98. Additionally, the one-directional seal 98 allows trapped fluid to vent, or escape the reception area 82, until the female stab 42 and the male stab 44 are engaged.

Figure 7:
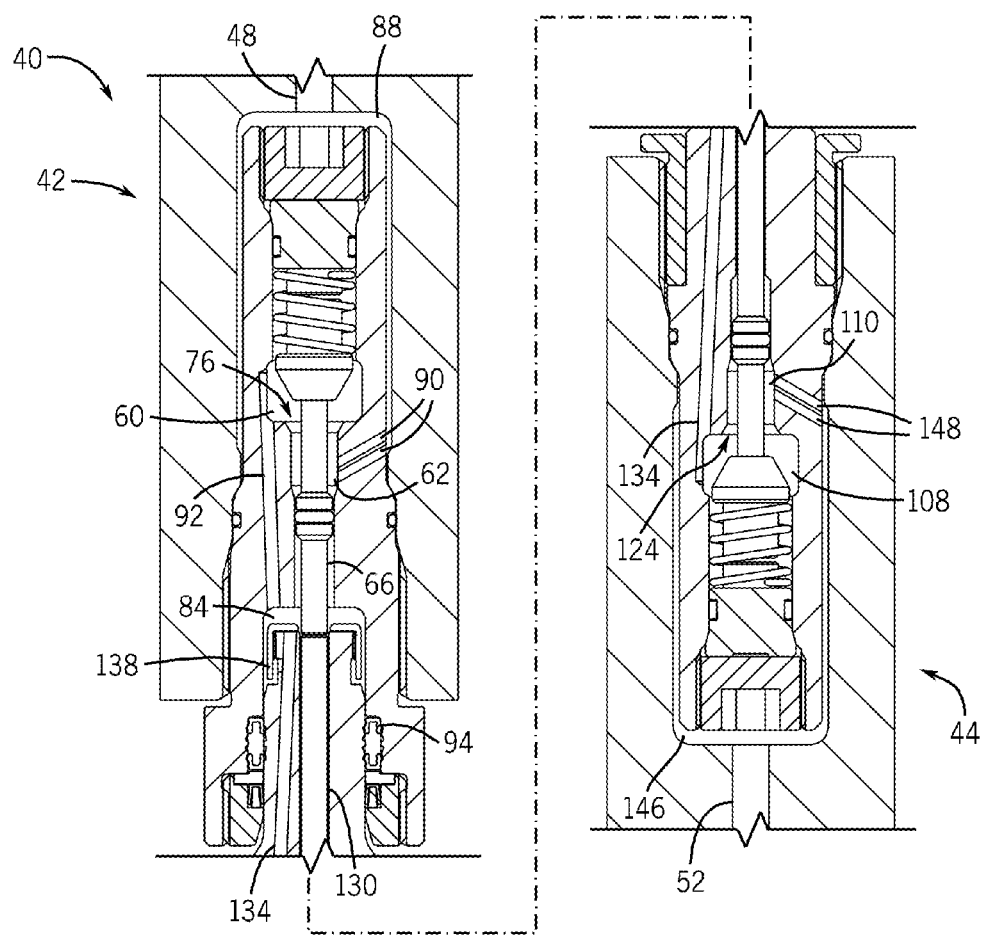
FIG. 7 is a partial cross-section of the engaged components of the hydraulic line coupling illustrated in FIG. 2.

As the female stab 42 and the male stab 44 are pushed together, contact force on the shafts 82 and 130 displaces the poppets 66 and 114, respectively, as illustrated in FIG. 7. In this illustration, hydraulic fluid may flow from the fluid source to the SCSSV via the following path: hydraulic line 48; coupling cavity 88; holes 90; shaft cavity 62; opening 76; valve cavity 60; bore 92; reception area 84; fluid trap 138; bore 134; valve cavity 108; opening 124; shaft cavity 110; holes 148; coupling cavity 146; and hydraulic line 52. Furthermore, the seal 94 blocks hydraulic fluid from leaking out of the coupling and heavy drilling fluid from entering the assembly.

Figure 8:
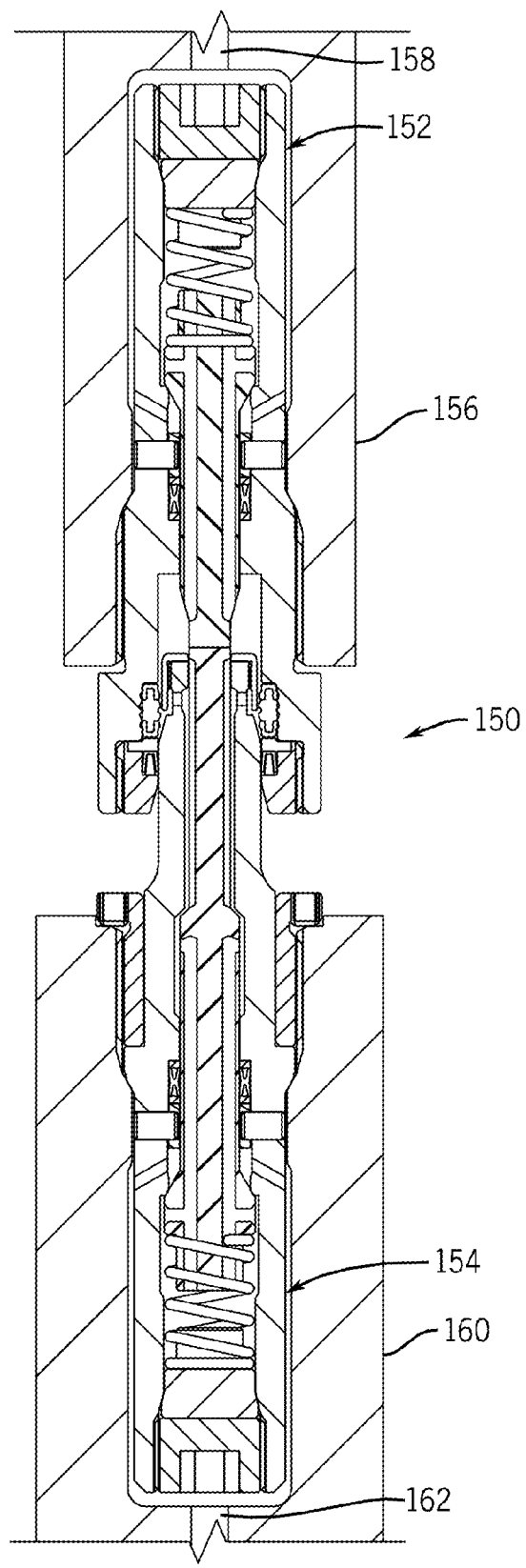
FIG. 8 is a partial cross-section of another embodiment of a hydraulic line coupling that may be used in the mineral extraction system of FIG. 1.

FIG. 8 depicts another exemplary embodiment of a stab-style hydraulic control line coupler 150 that includes a female stab 152 and a male stab 154. As with the embodiment illustrated in FIGS. 2-7, the female stab 152 may be coupled to a running tool 156 having a hydraulic fluid line 158. The female stab 152 may also be connected to a tree or any other well component having a hydraulic fluid line running therethrough. The male stab 154 may be coupled to a tubing hanger 160. A hydraulic fluid line 162 disposed within the tubing hanger 160 may be used to transport hydraulic fluid from the coupler 150 to hydraulic valves or other hydraulically controlled components in a wellhead member.

Figure 9:
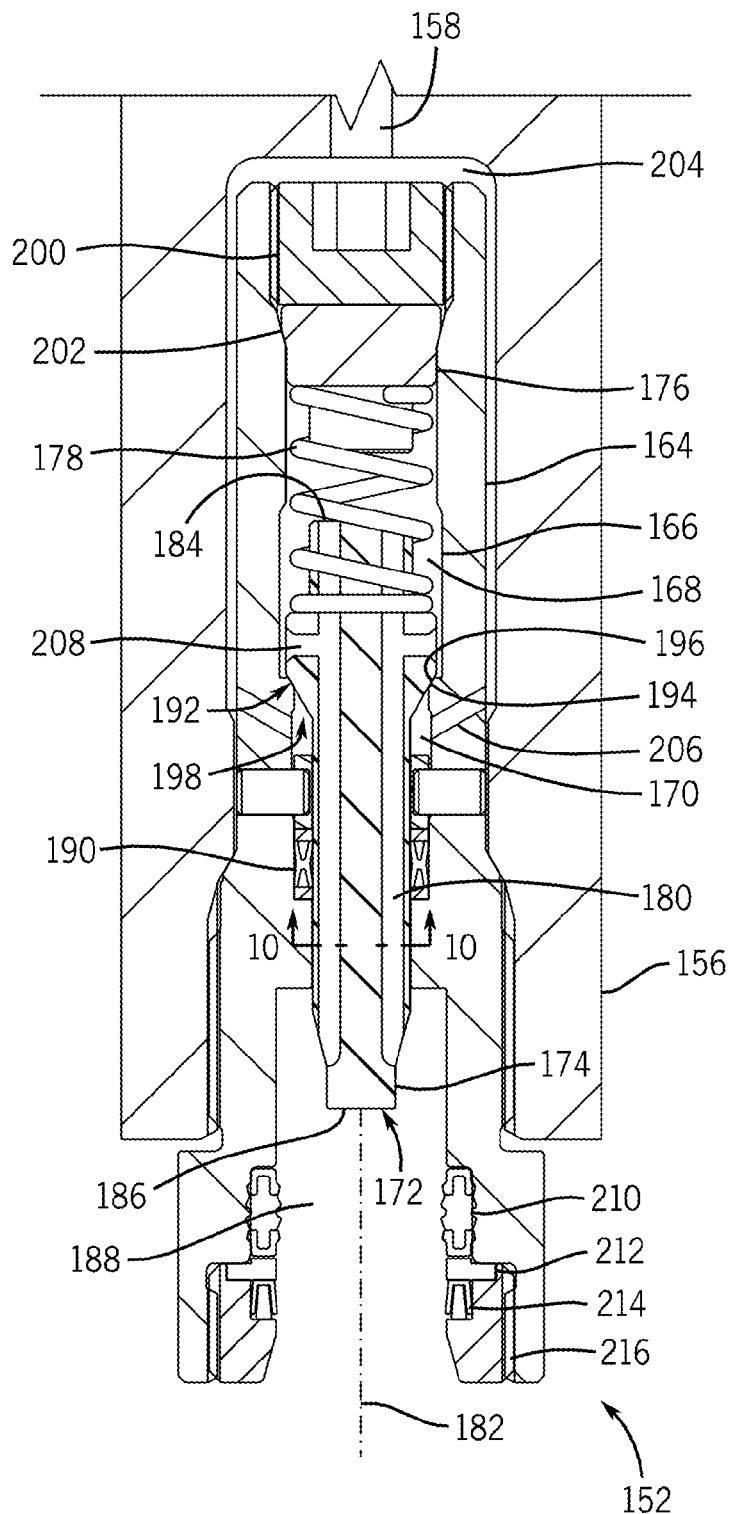
FIG. 9 is a partial cross-section of a first component of the hydraulic line coupling illustrated in FIG. 8.

FIG. 9 illustrates an embodiment of the female stab 152 disconnected from the male stab 154. The female stab 152 is made of a generally cylindrical body 164. The body 164 may be metal, such as corrosion-resistant stainless steel. The generally cylindrical body 164 may be screwed into or otherwise disposed within the running tool 156. A continuous bore 166 having varying diameters runs through the length of the body 164. The bore 166 may be divided into two general regions having dissimilar diameters, namely, a spring cavity 168 and a seal cavity 170. Situated within the bore 166 is a valve 172 configured to automatically close upon separation of the female stab 152 from the male stab 154.

Figure 10:
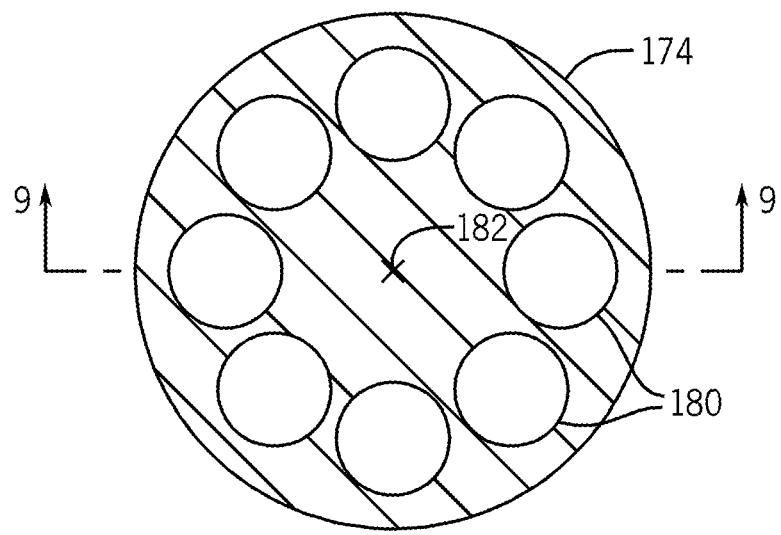
FIG. 10 is a cross-section of the first component of the hydraulic line coupling taken along line 10-10 of FIG. 9.

In the illustrated embodiment, the valve 172 includes a shaft 174 and a sealing plug 176 having a spring 178 disposed therebetween in the spring cavity 168. The shaft 174 may have a plurality of bores 180 disposed therethrough. The bores 180 may be generally disposed about an axis 182 running through the center of the shaft 174, as illustrated in FIG. 10. The bores 180 may extend from a first end 184 of the shaft 174 and be in fluid communication with the spring cavity 168. Near a second end 186 of the shaft 174, the bores 180 may be in fluid communication with a reception area 188 for receiving the male stab 154.

A seal 190 may be disposed around the shaft 174 in the seal cavity 170. The seal 190 is configured such that fluid is blocked from seeping between the seal cavity 170 and the reception area 188 around the shaft 174 regardless of whether the valve 172 is opened or closed. In addition, a metal seal 192 may block fluid from seeping between the spring cavity 168 and the seal cavity 170 when the valve 172 is closed. The shaft 174 may have a varying diameter including an angled surface 194. The angled surface 194 corresponds to an angled surface 196 of an opening 198 between the spring cavity 168 and the seal cavity 170. The angled surfaces 194 and 196 may press together to form the metal seal 192. The shaft 174 may be depressed to compress the spring 178 and open the valve 172, as described in more detail below. At the other end of the spring cavity 168, the sealing plug 176 may be secured within the bore 166 by a fastener 200, such as, for example, a hex socket set screw. Furthermore, in the illustrated embodiment, a shoulder 202 on the sealing plug 176 blocks the sealing plug 176 from moving within the spring cavity 168.

In use, the female stab 152 may be exposed to applied pressure or pressure from heavy well fluids. The described structures are configured such that the heavy well fluid is automatically blocked from entering and contaminating the hydraulic fluid passages when the female stab 152 is disengaged from the male stab 154. Hydraulic fluid may enter the female stab 152 through the line 158. A coupling cavity 204 is defined between the body 164 and the running tool 156. Hydraulic fluid may enter the coupling cavity 204 and flow through holes 206 to the seal cavity 170. When the stabs 152 and 154 are disengaged, heavy well fluid may enter the female stab 152 through the reception area 188 and flow through the bores 180 to the spring cavity 168. In addition, holes 208 may provide a pathway between the bores 180 and the circumference of the shaft 174 through which heavy fluid may flow to the spring cavity 168.

When the shaft 174 is not depressed, such as when the female stab 152 is disengaged from the male stab 154, the spring 178 automatically biases the angled surface 194 of the shaft 174 into the opening 198. The heavy well fluids in the spring cavity 168 further apply pressure to the shaft 174, thereby supplementing the spring biasing force to provide the metal seal 192 between the angled surface 194 of the shaft 174 and the angled surface 196 of the opening 198. Counter pressure may also be applied to the shaft 174 from the hydraulic fluid in the seal cavity 180; however this pressure is generally less than the pressure on the shaft 174 from the heavy drilling fluid and the spring 178. The pressure from the hydraulic fluid may build up enough to overcome the pressure from the heavy drilling fluid and the spring 178, for example, if the hydraulic fluid source is turned on to flush the heavy drilling fluid from the female stab 152 before it is coupled to the male stab 154. If the pressure of the hydraulic fluid in the seal cavity 170 becomes great enough, the shaft 174 may be displaced from the opening 198 to alleviate the pressure in the hydraulic fluid. If the pressure in the hydraulic fluid decreases, the angled surface 194 of the shaft 174 is again automatically biased into the opening 198 by the spring 178 and the pressure of the fluid in the spring cavity 168 to create the metal seal 192.

Furthermore, the female stab 152 includes a seal 210 configured to block leakage of the hydraulic fluid during use. The seal 210 may, for instance, be an elastomeric seal with metal caps (e.g., a metal endcap seal). A shoulder 212 holds the seal 210 in place in the body 164. A one-directional seal 214 is disposed below the seal 210 to allow escape of the heavy drilling fluid from the coupler 150 during coupling engagement, as described in more detail below. A nut 216 secures the one-directional seal 214 to the body 164 and holds the shoulder 212 in place.

Figure 11:
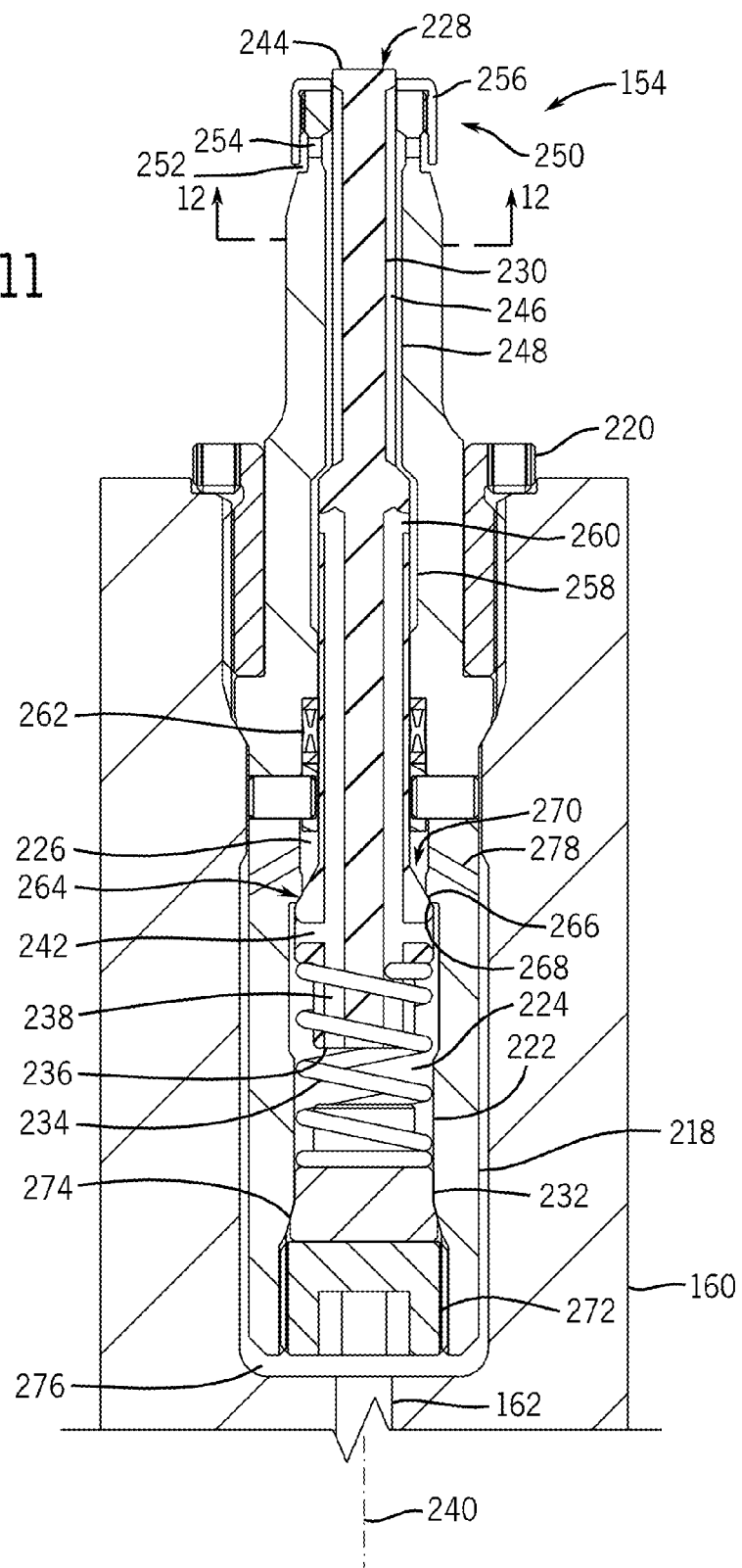
FIG. 11 is a partial cross-section of a second component of the hydraulic line coupling illustrated in FIG. 8.

FIG. 11 illustrates an embodiment of the male stab 154, which includes many of the same features described in the female stab 152. The male stab 154 includes a generally cylindrical body 218 made of metal, such as corrosion resistant stainless steel. The body 218 may be secured to the tubing hanger 160 via a nut 220. A continuous bore 222 having varying diameters runs through the length of the body 218. The bore 222 may be divided into a spring cavity 224 and a seal cavity 226 having dissimilar diameters. Situated within the bore 222 is a valve 228 configured to automatically close upon separation of the female stab 152 from the male stab 154.

Figure 12:
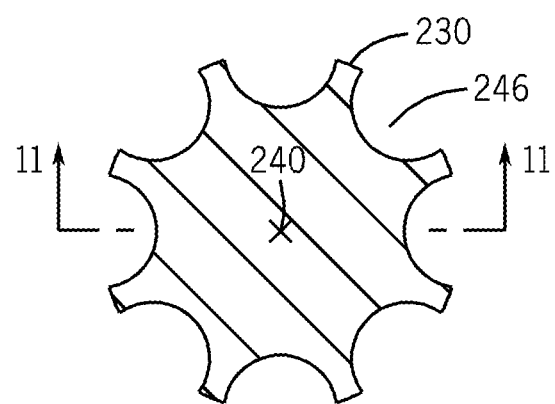
FIG. 12 is a cross-section of the second component of the hydraulic line coupling taken along line 12-12 of FIG. 11.

In the illustrated embodiment, the valve 228 includes a shaft 230 and a sealing plug 232 having a spring 234 disposed therebetween in the spring cavity 224. A portion of the shaft 230 near a first end 236 may have a plurality of axial bores 238 disposed therethrough similar to the axial bores 180 in the shaft 174 of the female stab 152. The bores 238 may be generally disposed about an axis 240 running through the center of the shaft 230. At the first end 236 of the shaft 230, the bores 238 may be in fluid communication with the spring cavity 224. In addition, radial holes 242 may provide further pathways from the bores 238 to the outer circumference of the shaft 230. A portion of the shaft 230 near a second end 244 may include notches 246 to facilitate fluid flow around the shaft 230 through the bore 222. FIG. 12 is a cross-section of the shaft 230 along a line 12-12. The notches 246 may be semi-circular, as illustrated in FIG. 12, or may be any other shape which provides fluid passages 248 between the shaft 230 and the bore 222. Fluid exterior to the male stab 154 may enter through a fluid trap 250. Within an indent 252, a hole 254 provides access to the fluid passages 248. A cover 256 substantially covers the indent 252, leading fluid to enter the indent 252 below the hole 254, thereby creating the fluid trap 250.

The portion of the shaft 230 containing the bores 238 may have a larger diameter than the portion of the shaft 230 having the notches 246. Accordingly, the continuous bore 222 through which the shaft 230 is disposed may have an indentation 258 around the shaft 230 where the shaft configuration transitions from the notches 246 to the bores 238. Holes 260 provide a pathway for fluid communication between the bores 238 and the indentation 258. A seal 262 blocks seepage of fluids between the indentation 258 and the seal cavity 226. The seal 262 may be disposed within the seal cavity 226, as illustrated in the present embodiment, or may be disposed around the shaft 230.

In addition, a metal seal 264 may block fluid from seeping between the spring cavity 224 and the seal cavity 226 when the valve 228 is closed. The shaft 230 may have a varying diameter including an angled surface 266. The angled surface 266 corresponds to an angled surface 268 of an opening 270 between the spring cavity 224 and the seal cavity 226. The angled surfaces 266 and 268 may press together to form the metal seal 264. The shaft 230 may be depressed to compress the spring 234 and open the valve 228, as described in more detail below. At the other end of the spring cavity 224, the sealing plug 232 may be secured within the bore 222 by a fastener 272, such as, for example, a hex socket set screw. Furthermore, in the illustrated embodiment, a shoulder 274 on the sealing plug 232 blocks the sealing plug 232 from moving within the spring cavity 224.

As with the female stab 152, the male stab 154 may be exposed to applied pressure or pressure from heavy well fluids. Furthermore, the tubing hanger 160 to which the male stab 154 is coupled may supply hydraulic fluid to various valves, such as the SCSSV. In order to protect the safety valve from being damaged due to a pressure build-up in the hydraulic control line, the male stab 154 is configured such that the pressure in the hydraulic tubing 162 may be released automatically, as with the female stab 152.

Generally, during use, hydraulic fluid flows through the coupler 150 (FIG. 8) before the male stab 154 is disengaged from the female stab 152. Accordingly, cavities and passages in the male stab 154 may contain hydraulic fluid before the male stab 154 is exposed to heavy well fluids. For example, hydraulic fluid may be present in the fluid trap 250, the fluid passages 248, the bores 238, and the spring cavity 224, and intervening areas. When the male stab 154 is disengaged from the female stab 152, the described components operate to automatically seal the hydraulic fluid line 162 from contamination by heavy drilling fluids. That is, the spring 234 automatically biases the valve 228 closed when the shaft 230 is not depressed. Furthermore, pressure applied to the shaft 230 from fluids in the spring cavity 224 supplement the spring 234 to create the metal seal 264 between the angled surface 266 of the shaft 230 and the angled surface 268 of the opening 270. Pressure is conveyed from the heavy drilling fluid outside the male stab 154 to the shaft 230 by compression of the hydraulic fluid within the male stab 154. That is, the external heavy drilling fluid attempts to enter the male stab 154 through the fluid trap 250. The heavy fluid remains at the bottom of the indent 252, while the hydraulic fluid remains in the holes 254 and the fluid passages 248. In addition to impeding entrance of heavy drilling fluid into the male stab 154, the fluid trap 250 blocks displacement of the hydraulic fluid by the heavy drilling fluid; therefore, any heavy drilling fluid that enters the male stab 154 merely compresses the hydraulic fluid in the fluid passages 248, the bores 238, and the spring cavity 224. Pressure on the shaft 230 from the compressed hydraulic fluid automatically supplements pressure from the spring 234 to form the metal seal 264.

As with the female stab 152 described above, in addition to automatically sealing the hydraulic fluid lines from contamination, the male stab 154 enables the release of pressure in the hydraulic fluid line to protect the valves, such as the surface controlled subsurface safety valve. Pressure in the hydraulic fluid from the SCSSV may be conveyed through a coupling cavity 276 and one or more holes 278 to the seal cavity 226. The holes 278 may also be disposed around the axis 240. Generally, the pressure on the shaft 230 from the fluid in the spring cavity 224 is greater than the pressure from the hydraulic fluid in the seal cavity 226, and the metal seal 264 remains closed. However, if the pressure from the SCSSV becomes too great, hydraulic fluid in the seal cavity 226 may open the valve 228 to relieve the pressure. Once the pressure has been relieved, the valve 228 is again automatically closed by the spring 234 and the pressure from the fluid in the spring cavity 224.

The design of the female stab 152 and the male stab 154 enables automatic operation of the valves 172 and 228. Merely disengaging the female stab 152 from the male stab 154 closes the valves 172 and 228. That is, no further controls must be implemented to close the fluid pathways in the coupling members. Furthermore, the forces on the valves 172 and 228 from the surrounding fluids (e.g., heavy drilling fluids) ensure that they remain closed, even under very high pressure. Indeed, the valves 172 and 228 close tighter as more pressure is applied from surrounding fluids, as described above.

Figure 13:
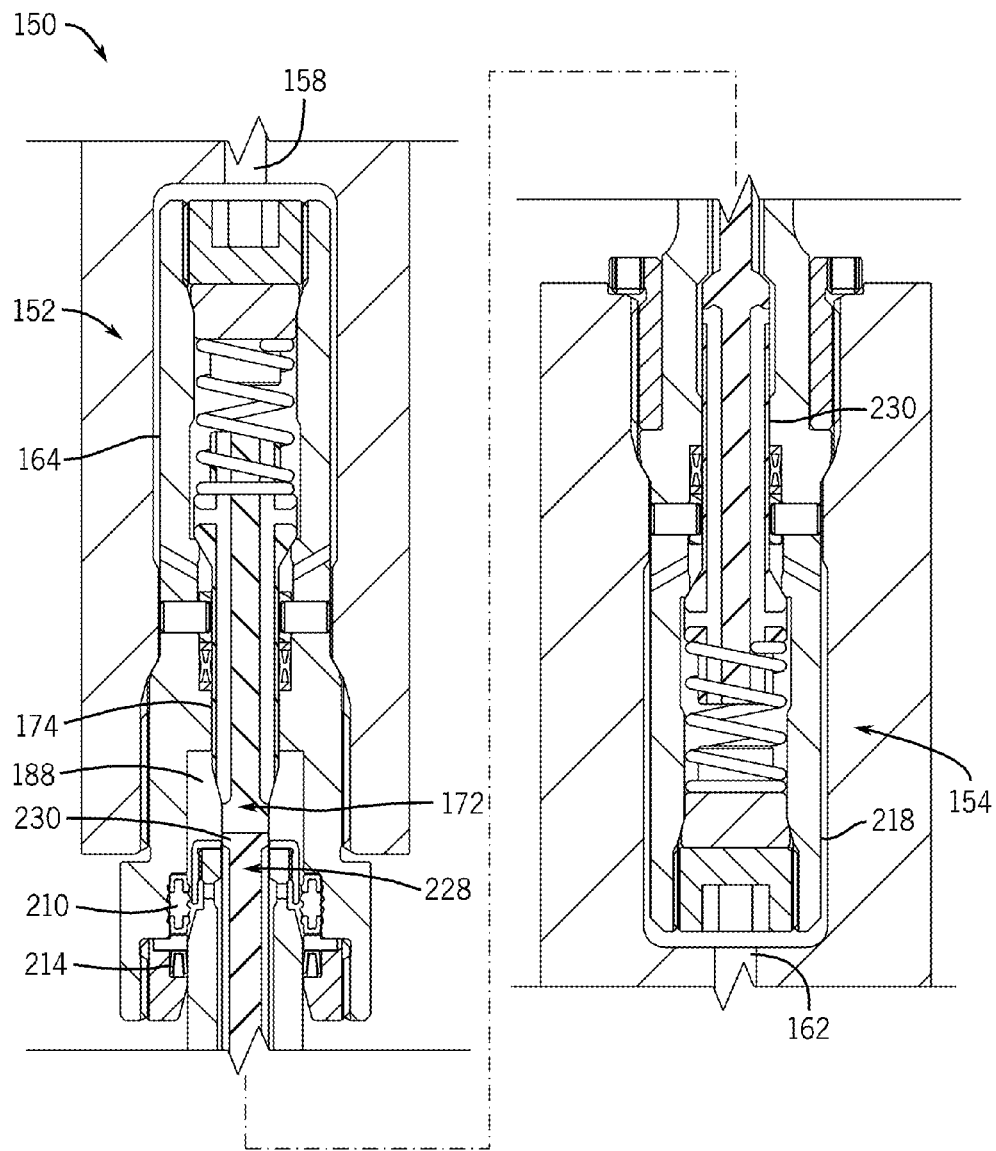
FIG. 13 is a partial cross-section of the partially engaged components of the hydraulic line coupling illustrated in FIG. 8.

FIG. 13 illustrates the female stab 152 and the male stab 154 in a partially coupled state. In this partially coupled state, the female shaft 174 is in contact with the male shaft 230, however neither shaft is displaced, as evidenced by the metal seals between the bodies 164 and 218 and the shafts 174 and 230, respectively. Prior to engagement of the coupler, the reception area 188 may be filled with heavy drilling fluid. As the female stab 152 and the male stab 154 are pushed together, heavy drilling fluid may be displaced from the reception area 188 by flowing out through the space between the seal 210 and the male body 218 past the one-directional seal 214. The reception area 188 may be flushed or purged by applying fluid through the hydraulic fluid line 158, thereby increasing the pressure enough to displace the shaft 230 and enable flow of hydraulic fluid through the female stab 152, as described above in regard to FIG. 9. Differential pressure or heavy drilling fluid is blocked from entering the reception area 188 during coupling by the one-directional seal 214. Additionally, the one-directional seal 214 allows trapped fluid to vent, or escape the reception area 188, until the female stab 152 and the male stab 154 are engaged.

Figure 14:
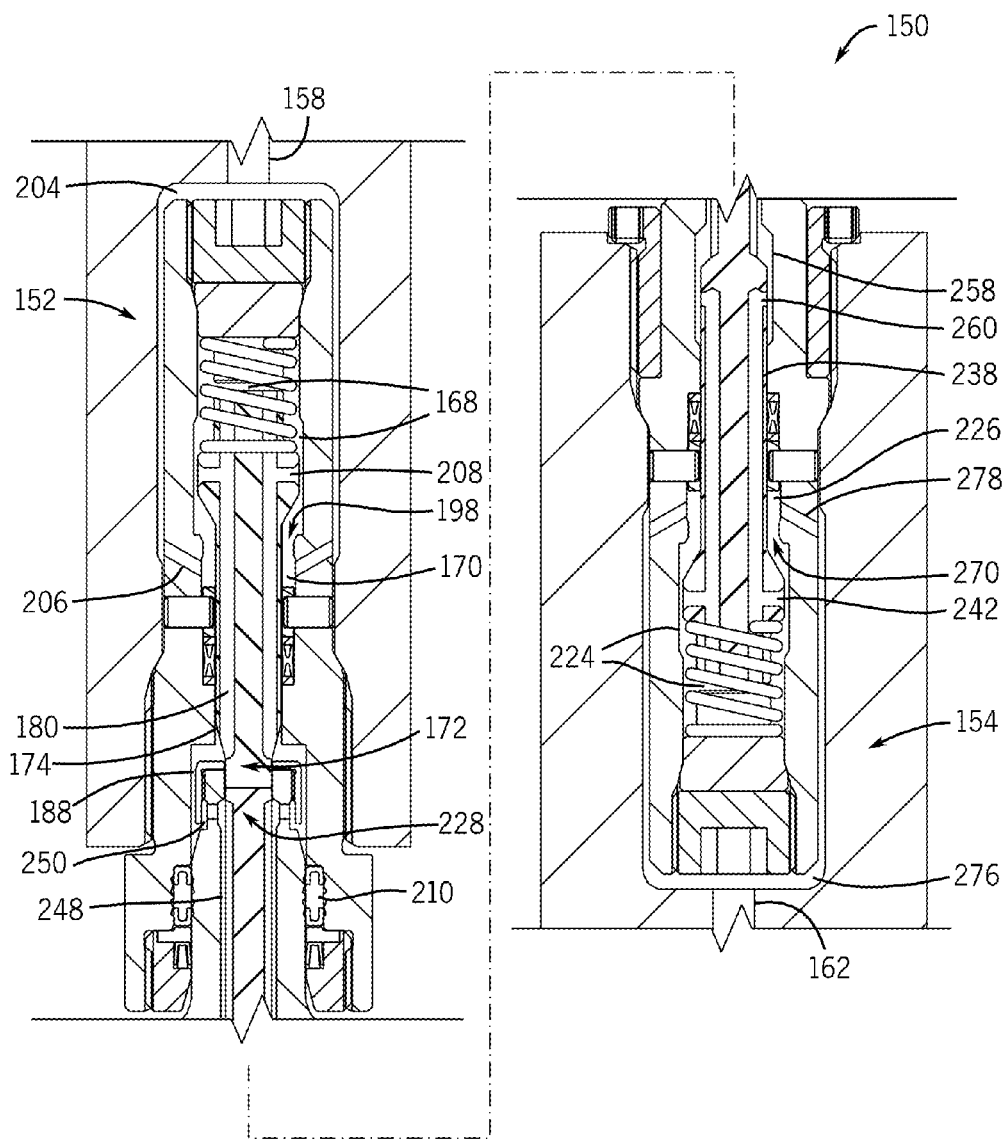
FIG. 14 is a partial cross-section of the engaged components of the hydraulic line coupling illustrated in FIG. 8.

As the female stab 152 and the male stab 154 are pushed together, contact force on the shafts 174 and 230 opens the valves 172 and 228, respectively, as illustrated in FIG. 14. In this illustration, hydraulic fluid may flow from the fluid source to the SCSSV via the following path: hydraulic line 158; coupling cavity 204; holes 206; seal cavity 170; opening 198; spring cavity 168; holes 208 and bores 180; reception area 188; fluid trap 250; fluids passages 248; indentation 258; holes 260; bores 238 and holes 242; spring cavity 224; opening 270; seal cavity 226; holes 278; coupling cavity 276; and hydraulic line 162. Furthermore, the seal 210 blocks hydraulic fluid from leaking out of the coupling and heavy drilling fluid from entering the assembly.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a hydraulic connector configured to couple hydraulic lines in a mineral extraction system, the connector comprising:
a first coupling configured to be secured to a first hydraulic line, wherein the first coupling comprises a first valve in a first fluid pathway, and the first valve is configured to selectively close a first opening in the first fluid pathway; and
a second coupling configured to be secured to a second hydraulic line, wherein the second coupling comprises a second valve in a second fluid pathway, and the second valve is configured to selectively close a second opening in the second fluid pathway;
wherein the first and second valves are automatically biased to close the first and second openings, respectively, to resist ingress of an external fluid when the first coupling is not mated to the second coupling, and the first valve is configured to automatically open the first opening when the first coupling is not mated to the second coupling and a first pressure of a first fluid within the first hydraulic line exceeds a second pressure of the external fluid by a threshold value.

2. The system of claim 1, wherein the first and second valves are configured to close the first and second openings, respectively, upon disengagement of the first coupling from the second coupling.

3. The system of claim 1, wherein the first valve is configured to release the first fluid into an external environment when the first valve is in an open position and the first coupling is not mated to the second coupling.

4. The system of claim 1, wherein the first valve comprises a poppet disposed within the first fluid pathway, and wherein the poppet is automatically biased to close the first opening in the first fluid pathway.

5. The system of claim 4, wherein the first valve comprises a shaft coupled to the poppet and configured to displace the poppet to open the first opening when the first coupling is mated to the second coupling.

6. The system of claim 1, wherein:
the first valve comprises a shaft disposed within the first fluid pathway;
the shaft comprises a sealing portion configured to block the flow of fluid through the first fluid pathway; and
the sealing portion is automatically biased to close the first opening in the first fluid pathway.

7. The system of claim 6, wherein the sealing portion comprises a frustoconical protrusion from the shaft.

8. The system of claim 6, wherein the shaft comprises a plurality of bores, notches, or a combination thereof, to enable the flow of fluid through and/or around at least a portion of the shaft.

9. The system of claim 6, wherein the shaft is configured to displace the sealing portion to open the first opening when the first coupling is mated to the second coupling.

10. The system of claim 1, wherein the first valve comprises a spring configured to automatically bias the first valve to close the first opening in the first fluid pathway.

11. The system of claim 1, wherein the first fluid pathway comprises:
a generally longitudinal bore having a third opening at or near a mating end of the first coupling;
a first cavity in which the first valve is generally disposed, wherein the first cavity is in fluid communication with the generally longitudinal bore;
a second cavity, wherein the second cavity is in fluid communication with the first cavity via the first opening; and
one or more holes, wherein the second cavity is in fluid communication with an exterior of the first coupling via the one or more holes.

12. The system of claim 1, wherein the first and second valves are configured to open the first and second openings, respectively, upon engagement of the first coupling to the second coupling 13. The system of claim 1, wherein the hydraulic lines are configured to supply hydraulic control fluid to a surface controlled subsurface safety valve.

14. The system of claim 1, wherein the connector is coupled to a christmas tree, a wellhead, a well, a mineral deposit, a valve, a case head, a tubing hanger, tubing, a running tool, a manifold, an umbilical, or another component of the mineral extraction system, or a combination thereof.

15. The system of claim 1, wherein the connector comprises a stab-style coupler.

16. A hydraulic fluid coupler, comprising:
a hydraulic fluid connector configured to couple a first hydraulic fluid line to a second hydraulic fluid line, the connector comprising a first coupling configured to be secured to the first hydraulic fluid line, wherein the first coupling comprises:
a first valve in a first fluid pathway, wherein the first valve is configured to transition between an open position that facilitates fluid flow through an opening and a closed position that blocks fluid flow through the opening;
a first cavity positioned on a first side of the opening, wherein the first cavity is configured to communicate with an external fluid when the first coupling is not mated to a second coupling; and
a second cavity positioned on a second side of the opening, opposite from the first side, wherein the second cavity is configured to communicate with a hydraulic fluid within the first hydraulic line;
wherein the first valve is biased toward the closed position and configured to automatically transition to the closed position when the first coupling is not mated to the second coupling, and the first valve is configured to automatically transition to the open position when a first force applied to the first valve by the hydraulic fluid within the second cavity exceeds a second force applied to the first valve by a combination of the external fluid within the first cavity and the bias toward the closed position.

17. The hydraulic fluid coupler of claim 16, comprising the second coupling, wherein:
the second coupling is configured to be secured to the second hydraulic fluid line and comprises a second valve in a second fluid pathway;
the second valve is configured to automatically close when the first coupling is not mated to the second coupling; and
the second valve is configured to automatically release a pressure build-up in the second hydraulic fluid line while the first coupling is not mated to the second coupling.

18. The hydraulic fluid coupler of claim 17, wherein the first valve is configured to automatically transition to the closed position and the second valve is configured to automatically close upon disengagement of the first coupling from the second coupling.

19. The hydraulic fluid coupler of claim 16, wherein the first valve comprises a poppet disposed within the first fluid pathway.

20. The hydraulic fluid coupler of claim 19, wherein the first valve comprises:
a shaft coupled to the poppet and configured to displace the poppet toward the open position when the first coupling is mated to the second coupling; and
a spring configured to automatically bias the poppet toward the closed position.

21. The hydraulic fluid coupler of claim 16, wherein:
the first valve comprises a shaft disposed within the first fluid pathway;
the shaft comprises a sealing portion configured to block the fluid flow through the opening.

22. The hydraulic fluid coupler of claim 21, wherein:
the sealing portion comprises a frustoconical protrusion from the shaft;
the shaft comprises a plurality of bores, notches, or a combination thereof, to enable the flow of fluid through and/or around at least a portion of the shaft;
the shaft is configured to displace the sealing portion to transition the first valve toward the open position when the first coupling is mated to the second coupling; and
the first valve comprises a spring configured to automatically bias the sealing portion toward the closed position.

23. The system of claim 16, wherein the first valve is configured to release the hydraulic fluid into an external environment when the first valve is in the open position and the first coupling is not mated to the second coupling.

24. The system of claim 16, wherein the first valve is configured to transition to the open position upon engagement of the first coupling to the second coupling.

25. A method, comprising:
automatically biasing a first valve in a first mating member closed when the first mating member is disengaged from a second mating member, wherein the first mating member comprises:
a securing member configured to secure the first mating member to a hydraulic fluid line; and
a fluid pathway, wherein the first valve is configured to block an opening in the fluid pathway when the first valve is closed; and
automatically opening the first valve to facilitate fluid flow through the opening when the first mating member is disengaged from the second mating member and a first pressure of a hydraulic fluid within the hydraulic fluid line exceeds a second pressure of an external fluid by a threshold value.

26. The method of claim 25, comprising opening the first valve to facilitate fluid flow through the opening upon engagement of the first mating member to the second mating member.

27. The method of claim 25, comprising releasing the hydraulic fluid into an external environment when the first valve is open and the first mating member is disengaged from the second mating member.

28. The method of claim 25, comprising automatically biasing a second valve in the second mating member closed when the second mating member is disengaged from the first mating member.

29. The method of claim 25, wherein automatically biasing the first valve closed comprises receiving pressure from a spring.

30. The method of claim 25, wherein automatically biasing the first valve closed comprises receiving the second pressure from the external fluid.

* * * * *